July 14, 1925.  
E. C. AUBITZ  
CASTER SOCKET  
Filed Aug. 7, 1923
1,546,186
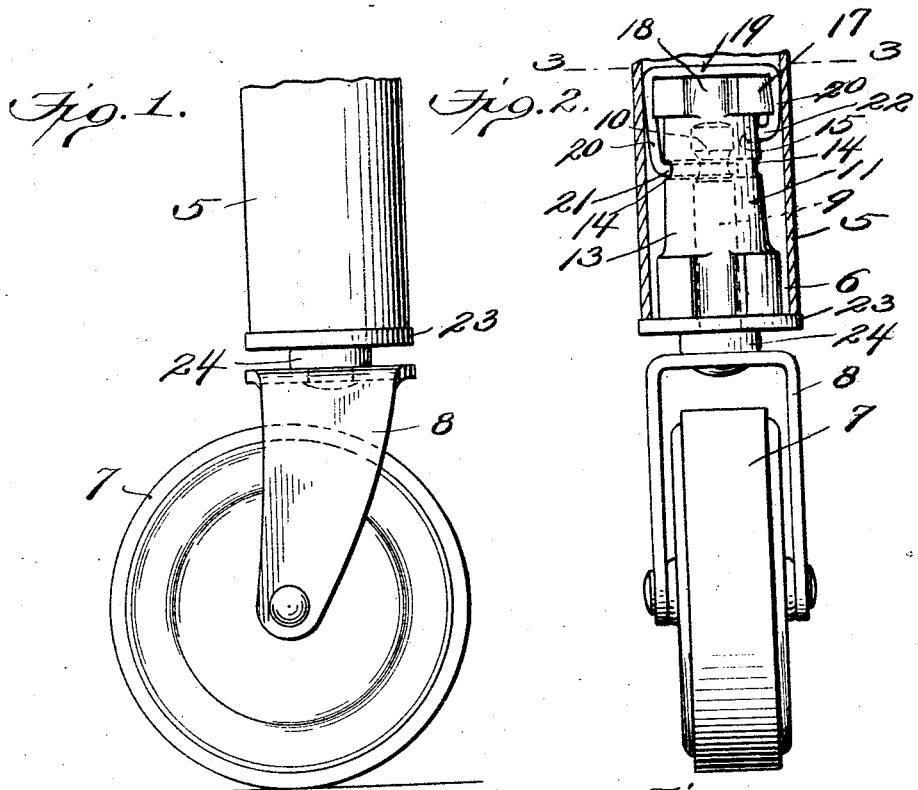
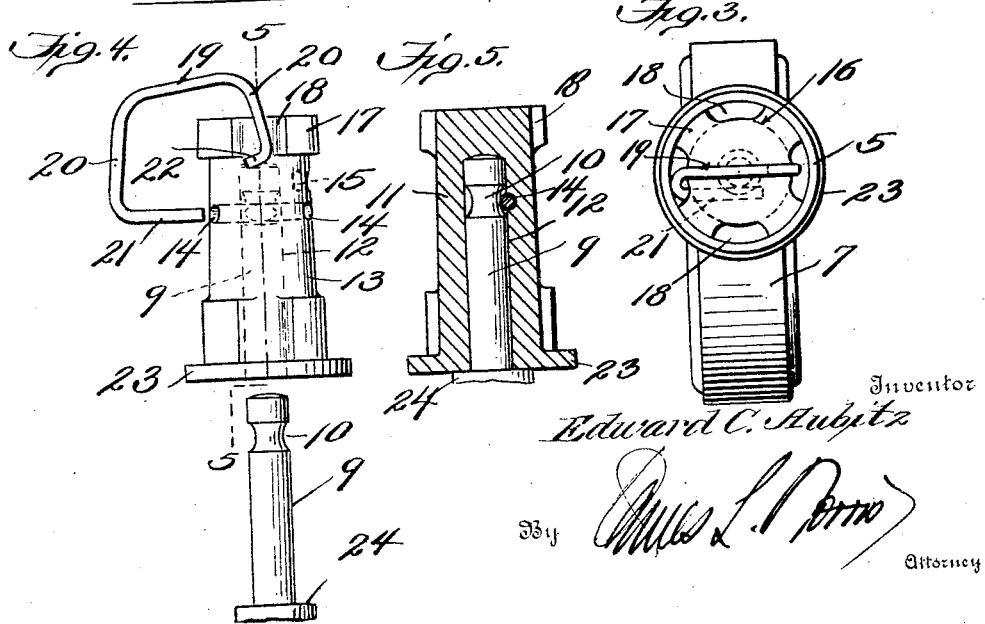
Inventor  
Edward C. Aubitz  
By  
Attorney Patented July 14, 1925.

1,546,186

UNITED STATES PATENT OFFICE.

EDWARD C. AUBITZ, OF WARREN, PENNSYLVANIA, ASSIGNOR TO G G G METAL STAMPING COMPANY, OF WARREN, PENNSYLVANIA, A CORPORATION OF PENNSYLVANIA.

CASTER SOCKET.

Application filed August 7, 1923. Serial No. 656,229.

*To all whom it may concern:*

Be it known that I, EDWARD C. AUBITZ, a citizen of the United States, residing at Warren, in the county of Warren and State of Pennsylvania, have invented new and useful Improvements in Caster Sockets, of which the following is a specification.

This invention relates to furniture casters and particularly to an improved caster socket comprising a tube which is fitted in the opening of a furniture leg or supporting device and engaged by the socket with which the pintle or post of the caster is movably associated.

At the present time there is no tube made which is accurate and usually the sockets are cast full all the way around, or without any provision for the accommodation of irregularities, and there are always burrs and variations present in the metal leg extremity which will not allow the socket to be properly seated therein and requiring bed manufacturers either to machine down the caster or socket or ream out the tubular leg extremity in which the socket is inserted.

The primary object of the invention, therefore, is to provide a caster socket which is approximately of star shape, or has longitudinal recesses or grooves at opposite points therein to allow for variations in the tubular leg extremities as generally constructed and including the well known type of lock joint tubular leg extremity, which has a decided projection on the inside where the seam or joint is located. A further object of the invention is to provide a caster socket which may be practically fitted in place or applied to the tubular extremity of the furniture leg or support without requiring machine work or tool manipulation to obtain a proper assemblage, and by this means a material reduction in the expense of inserting a caster socket in the tubes or tubing of furniture legs and supports is effected without in the least detracting from the operation or service of a caster. A still further object of the invention is to provide a caster socket having means associated therewith for locking the caster pintle or stem in the socket in such manner as to permit a rotation of the pintle stem but obstructing accidental separation of the caster pintle or stem from the socket.

With these and other objects and advantages in view, the invention consists in the construction and arrangement of the several parts which will be more fully hereinafter described and claimed.

In the drawing:

Fig. 1 is a side elevation of a portion of a furniture leg or extremity and a caster comprising the features of the invention;

Fig. 2 is a transverse vertical section through the tube or tubular extremity of a furniture leg or support and illustrating the socket and caster in elevation, the caster being shown in a plane at right angles to that illustrated in Fig. 1;

Fig. 3 is a horizontal section on the line 3—3, Fig. 2;

Fig. 4 is a detail elevation showing the socket, the caster pintle or stem and the improved fastening means in separated relation; and Fig. 5 is a transverse vertical section on the line 5—5, Fig. 4, showing the caster pintle or stem locked against accidental withdrawal from the socket.

The numeral 5 designates a furniture leg extremity, support or analogous device adapted to receive a caster and formed with a bore 6 opening through the bottom of the same, to provide a tubular extremity. The caster proper comprises a roller 7 having a yoke 8 embracing the same and attached thereto as usual, the top of the yoke also having a pintle or stem 9 rising therefrom and formed with a circumferential groove 10 near the upper end thereof, to provide a seat or recess for receiving a fastening means which will be presently explained.

The invention resides in a socket 11 having a vertical pintle or stem bore 12 opening through the bottom thereof as clearly shown by Fig. 5. The intermediate portion or waist 13 of the socket 11 is reduced in diameter and has opposite alined openings 14 extending horizontally thereinto and communicating with the upper portion of the pintle or stem bore 12, and above the openings another opening 15 is formed in one side of the socket. The upper and lower extremities of the socket 11 have a substantially star-shaped configuration 16, as shown by Fig. 3 in full and dotted lines, to provide alternately disposed projections and recesses 17 and 18, which may be of any desired dimensions, and while four projections 17 are illustrated and the same number of recesses 18, it will be understood that the latter may be varied in number.

The upper end or extremity of the socket 11 is closed and flat and the longitudinal extent of the projections and recesses 17 and 18 at said extremity is less than the corresponding projections and recesses of the lower extremity, the socket being slightly tapered towards its upper end.

The outer edges of the projections 17 are arcuate and conform to the inner curvature of the tubular extremity 5 and engage the inner surface of the bore 6 of said extremity when the socket 11 carrying the caster wheel 7 and the pintle or stem 9 is inserted in the said extremity.

The fastening means preferably used in the present instance for securing the pintle or stem 9 in the socket 11 against accidental withdrawal or disengagement consists of a wire loop 19 having opposite depending legs 20, which are bent inwardly and terminate respectively in a long horizontal key member 21 and a shorter horizontal securing member 22. The loop 19 with the legs 20 spread apart is applied over the top or upper end of the socket 11 and the legs 20 are then forced inwardly to cause the key member 21 of the one leg to pass through the openings 14 and the shorter securing member 22 of the other leg to enter the opening or socket 15. The key member 21 extends across the bore 12 of the socket 11 at one side and also engages the circumferential recess 10 of the pintle or stem 9, and by this means the said pintle or stem is permitted to have free rotation within the socket but is positively held against longitudinal movement in the socket to any appreciable extent to obstruct withdrawal or accidental displacement from the socket. When the loop 19 of the securing means is applied, the upper portions of the opposite legs 20 engage opposite recesses 18, and the diameter of the wire of the securing means is such that the portions of the legs which engage the recesses will be within the outer curved edges of the projections 17. The legs 20 of the securing means also assist in frictionally holding the socket 11 in the tube 19, and the upper terminal wall of the bore or seat 6 is engaged by the top horizontal portion of the loop 19 as shown by Fig. 3, and by this means the said loop is positively held against any tendency to become disengaged from the socket.

When the pintle or stem 9 is inserted in the socket a lower base flange 23 of the socket bears against the lower end of the tubular extremity 5 and the usual collar 24 of the pintle or stem in turn bears against the underside of the socket in central relation to the flange 23.

By means of the recesses 18 arranged at opposite portions of the socket 11 as hereinbefore explained, any irregularities or projections due to the formation of the tube 19 or inward projections of the latter may be accommodated, and as a consequence, the socket and tube may be readily associated without requiring the usual machine or tool treatment, with material reduction in the cost of assembling caster organizations in connection with furniture legs or supports and also to compensate for any seam joints or other inward projections of various types of tubular extremities 5 which are fitted in the bore or seat 6. The wire loop 19 at the top also fills out the socket, to make the latter as large at the top as at the bottom, and the upward taper of the socket compensates for the projection of the said loop at the upper portion of the socket, and at the same time the legs of the wire loop project outward far enough to provide the frictional binding in the tubular leg extremity necessary to overcome loose association of the socket with said extremity.

The improved device will be found exceptionally advantageous, and it will be understood that changes in the general proportions and dimensions of the socket, tube and fastening means may be adopted without departing from the spirit of the invention.

What is claimed as new is:

1. A caster of the class specified for insertion in the tubular extremities of furniture legs, comprising a socket of integral formation having a closed top portion with a bore extending upwardly thereinto from the lower end and also formed with alternately arranged radial projections and recesses at opposite extremities and an intermediate diametrically reduced portion to provide an exterior recess between the said projections, a caster having a pintle removably and rotatably mounted in the socket and formed with an upper circumferential groove, and fastening means applied over the top of the socket and having an angular long extremity inserted into the socket and engaging the groove of the pintle to hold the pintle against accidental displacement, the said fastening means having a shorter angular extremity extending partway into the socket.

2. A caster of the class specified for insertion in the tubular extremities of furniture legs, comprising a socket of integral formation having alternate projections and recesses at the upper and lower ends thereof in alinement to compensate for structural irregularities of the tubular furniture leg and also provided with an intermediate reduced portion, a caster having a pintle rotatably mounted in the socket, and fastening means applied over the upper end of the socket and having angular extremities extending into the socket and engaging the pintle and also projecting partway into the socket, and said angular extremities engaging the socket at different elevations.

3. A caster of the class specified in combination with the tubular leg extremity of furniture, the caster comprising a socket of integral formation frictionally mounted within the said tubular extremity and provided with alternately arranged radial projections and recesses at opposite extremities and an intermediate diametrically reduced upper tapered portion, the caster having a pintle rotatably and removably mounted in the socket, and fastening means applied to the upper portion of the socket and having downwardly bent members with angular extremities respectively inserted in the socket and engaging the pintle to prevent displacement of the latter from the socket and also engaging the socket to retain the same in applied association with the upper extremity of the socket.

4. A caster of the class specified for insertion in a tubular leg extremity of furniture, consisting of a socket inserted and frictionally held in the said extremity, the socket having alternately arranged radial projections and recesses and also having a bore extending longitudinally thereof and openings formed horizontally therein and a single opening at one side, a fastening device extending over the upper end of the socket and having members adapted to be inserted in the said horizontal openings and the single side opening, and a caster having a pintle with a reduced portion engaged by one of the members of the fastening device to hold the pintle against accidental displacement with relation to the socket, the fastening device operating also to frictionally hold the socket in the tube.

5. A non-yielding socket for a caster formed of cast metal and having longitudinally extending radially disposed projections with recesses therebetween at opposite extremities, the socket also being formed with a closed top and a bore extending upwardly thereinto and through the bottom, the body of the socket near the top being formed with opposite alined openings at right angles to the bore and also with a third opening above the said alined openings for the reception and retention of fastening means to removably secure a caster pintle in the socket.

6. A caster socket of integral rigid formation having at opposite extremities radial projections extending longitudinally thereof and intersected by recesses to give the socket a substantially star-shaped form at the upper and lower ends, the socket being tapered from its lower towards its upper end and closed at the top, the socket being also intermediately reduced to form an outer circumferential recess and provided with a bore opening through the lower end and extending upwardly into the body of the socket, the upper portion of the socket being formed with transversely alined openings communicating with the bore and at right angles to the latter and also with a third opening above the said alined openings, the bore being adapted to removably receive a caster pintle and the openings to receive extremities of securing means for the pintle, the projections and recesses of the socket compensating for irregularities of the part in which the same may be inserted and the upper projections and recesses providing means for application and retention of the fastening means for the pintle.

In testimony whereof I have hereunto set my hand.

EDWARD C. AUBITZ.